(12) United States Patent
Yoon et al.

(10) Patent No.: US 10,518,713 B1
(45) Date of Patent: Dec. 31, 2019

(54) CARRIER APPARATUS FOR A VEHICLE (71) Applicants: Il Shik Yoon, Seoul (KR); Jun Chan Yoon, Seoul (KR)

(72) Inventors: Il Shik Yoon, Seoul (KR); Jun Chan Yoon, Seoul (KR)

( * ) Notice: Subject to any disclaimer, the term of this patent is extended or adjusted under 35 U.S.C. 154(b) by 0 days.

(21) Appl. No.: 16/107,444

(22) Filed: Aug. 21, 2018

Related U.S. Application Data (60) Provisional application No. 62/549,070, filed on Aug. 23, 2017.

(51) Int. Cl.
*B60R 9/10* (2006.01)
*B60R 9/06* (2006.01)

(52) U.S. Cl.
CPC . *B60R 9/10* (2013.01); *B60R 9/06* (2013.01)

(58) Field of Classification Search
CPC ................ B60R 9/04; B60R 9/06; B60R 9/10
USPC .......................... 224/309, 924; D12/407, 408
See application file for complete search history.

(56) References Cited

U.S. PATENT DOCUMENTS

| 3,437,248 | A | * | 4/1969 | Allen | B60R 9/10 224/513 |
| 4,265,382 | A | * | 5/1981 | Edwards | B60R 9/06 224/309 |
| 5,476,201 | A | * | 12/1995 | Hall | B60R 9/10 224/309 |
| 5,560,525 | A | * | 10/1996 | Grohmann | B60R 9/06 224/282 |
| 5,690,259 | A | * | 11/1997 | Montani | B60R 9/042 224/310 |
| 5,749,694 | A | * | 5/1998 | Ackerman | B60R 9/06 224/482 |
| 7,232,170 | B2 | * | 6/2007 | Watson | B60R 9/06 224/310 |
| 9,434,320 | B2 | * | 9/2016 | Peck | B60R 9/10 |
| 10,239,461 | B1 | * | 3/2019 | Yoon | B60R 9/058 |
| 2007/0102464 | A1 | * | 5/2007 | Garoffolo | B60R 9/042 224/310 |

(Continued)

FOREIGN PATENT DOCUMENTS

| CA | 2237800 A1 | * | 11/1999 | ............. B60R 9/042 |
| DE | 10308062 A1 | * | 9/2004 | ............... B60R 9/06 |
| DE | 10342177 A1 | * | 4/2005 | ............... B60R 9/06 |

*Primary Examiner* — Justin M Larson
(74) *Attorney, Agent, or Firm* — Richard John Bartz (57) ABSTRACT

The present invention relates to a carrier apparatus for a vehicle in which the number of components is reduced and various functions are added in comparison with a carrier apparatus in the related art, and the carrier apparatus includes: a horizontal supporting means 50 which perpendicularly traverses article mounts 40 of two carriers C1 and C2 for a vehicle, is coupled to lower portions of the article mounts 40, has two lateral bars 52 protruding upward from the article mounts 40, has shock absorbing members 56 fitted with two horizontal bars 54 perpendicular to the lateral bars 52, and has a quadrangular frame shape; two reinforcing members 25 which horizontally connect vertical supports 20 and horizontal supports 30 of the two carriers C1 and C2 for a vehicle; and loops 42 which are installed on bottom surfaces of the article mounts 40 of the two carriers C1 and C2 for a vehicle such that a fixing strap 43 is fitted with the loop 42, in which the fixing strap 43, which is installed through the loops 42, is fixed to an appropriate position of a vehicle body.

13 Claims, 9 Drawing Sheets

(56) References Cited

U.S. PATENT DOCUMENTS

2018/0272956 A1* 9/2018 Yoon .................. B60R 9/10
2019/0084489 A1* 3/2019 Yoon .................. B60R 9/06

* cited by examiner

9B

CARRIER APPARATUS FOR A VEHICLE

CROSS REFERENCE TO RELATED APPLICATION

This application claims the priority of U.S. Provisional Patent Application Ser. No. 62/549,070 filed Aug. 23, 2017.

TECHNICAL FIELD

The present invention relates to a carrier apparatus for a vehicle, and particularly, to a carrier apparatus for a vehicle in which the number of components is reduced and various functions are added in comparison with a carrier apparatus in the related art.

BACKGROUND ART

Recently, various carriers for a vehicle are being developed in order to mount and carry a bicycle, a snowboard, skis, or a heavy article on an outer portion of a vehicle. However, because most of the carriers in the related art need to be attached to or detached from the vehicle by using a complicated device, there is a problem in that a lot of time is required for users to install and separate the carriers, and a process of installing and separating the carriers is complicated.

SUMMARY OF THE INVENTION

The present invention has been contrived in consideration of the problems, and a main object thereof is to provide a carrier apparatus for a vehicle, in which a carrier may be simply fixed to and separated from a vehicle by an operation of opening and closing a trunk of the vehicle without using a separate fixing device, the carrier may be stably fixed without swaying even though the vehicle stops and starts suddenly, impact occurs, or the vehicle travels at a high speed, various additional functions are provided, and the number of components is reduced.

To achieve the object, the present invention provides a carrier apparatus for a vehicle, in which two carriers C1 and C2 for a vehicle are disposed and coupled in parallel and each of the carriers C1 and C2 has a vertical support 20 which is supported on a rear surface of a trunk of the vehicle, a horizontal support 30 which is connected to the vertical support 20 at a fixed angle and supported on an upper surface of the trunk of the vehicle, an article mount 40 which is rotatably connected to the vertical support or the horizontal support, has a U shape entirely, and supports an article, and an article stand 92 which is rotatably connected to the vertical support or the horizontal support, is fixed at a right angle with respect to the article mount 40, and supports the article, the carrier apparatus including:

a horizontal supporting means 50 which perpendicularly traverses the article mounts 40 of the two carriers C1 and C2 for a vehicle, is coupled to lower portions of the article mounts 40, has two lateral bars 52 protruding upward from the article mounts 40, has shock absorbing members 56 fitted with two horizontal bars 54 perpendicular to the lateral bars 52, and has a quadrangular frame shape;

two reinforcing members 25 which horizontally connect the vertical supports 20 and the horizontal supports 30 of the two carriers C1 and C2 for a vehicle; and loops 42 which are installed on bottom surfaces of the article mounts 40 of the two carriers C1 and C2 for a vehicle such that a fixing strap 43 is fitted with the loop 42, in which the fixing strap 43, which is installed through the loops 42, is fixedly tightened to an appropriate position of a vehicle body, for example, a vehicle door frame.

According to the present invention, a second article stand 94, which has the same structure as the article stand 92, may be rotatably installed on the article mount 40 of each of the two carriers C1 and C2 for a vehicle so as to be spaced apart from the article stand 92 at an interval. In this case, a fixing means 70 having an inverted L shape may be rotatably installed on each of the article mounts 40 at a position between the article stand 92 and the second article stand 94, and a clamp 72 may be installed at an end portion of the fixing means 70, such that a bicycle is fixed by clamping a frame of the bicycle with the clamp, or a ski or board is fixed by clamping one side of the ski or board with the clamp.

The carrier apparatus may further include a straight handle horizontal bar 60 which perpendicularly traverses the article mounts 40 at positions of rotatably connecting portions of the article stands 92 of the carriers C1 and C2, is coupled to both of the article mounts 40, serves as a stopper for preventing the article stand 92 from being further rotated in a state in which the article stand 92 stands upright, and supports a handle of a bicycle when the bicycle is mounted, in which a plurality of handle fixing means 62 for coupling the handle of the bicycle to the handle horizontal bar 60 is installed.

In addition, the carrier apparatus of the present invention configured as described above may further include a straight horizontal bar 80 which is horizontally installed at a position of one end portion of the article mount 40 of each of the two carriers C1 and C2 for a vehicle, in which circular wheels 82, which are made of a shock absorbing material, are rotatably installed at both sides of the horizontal bar 80, two shock absorbing members 84, which are made of a shock absorbing material, are rotatably installed on the horizontal bar 80 between the two wheels 82, one end portion of each of the shock absorbing members 84 has an uneven surface, and a sucker 86 is installed at a side opposite to the uneven surface, such that the uneven surface of the shock absorbing member 84 is directed toward a vehicle roof when supporting a small load, and the sucker 86 is directed toward the vehicle roof and attached to the vehicle roof when supporting a heavy load. In this case, guide washers 90 having a spool shape may be installed at both end portions of the horizontal bar outside the two wheels 82, and loop-shaped roof rails 100, which are fixed to the vehicle roof at positions corresponding to the guide washers 90 and detachably coupled to the guide washers 90, may be installed at both sides of the vehicle roof, such that when the vehicle trunk is opened in the state in which the carrier apparatus is installed, the guide washer 90 is separated from the roof rail 100 as the article mount 40 moves forward toward a front side of the vehicle and the wheel 82 rolls along the vehicle roof, and when the trunk is closed, the guide washer 90 is engaged with a loop portion of the roof rail 100 as the article mount 40 moves rearward, such that the carrier apparatus is fixed to the vehicle.

In addition, a U-shaped ski/board mount 74 may be installed at one end portion or both end portions of the horizontal bar 54 of the horizontal supporting means 50, a lower edge portion of the ski or board may be inserted into a groove of the ski/board mount 74, and an upper edge portion of the ski or board may be fixed by the clamp 72 of the supporting means 70.

In addition, a flap 110 having a streamlined blade shape may be installed on the horizontal bar 80 to reduce air resistance when the vehicle travels.

According to the carrier apparatus for a vehicle according to the present invention, which is configured as described above, the carrier may be stably fixed without swaying and a complicated device even under any adverse condition, for example, sudden acceleration and deceleration, impact occurring when the vehicle passes over a speed bump, and an influence by wind outside the vehicle.

In addition, because a carrier fixing device may be configured by various methods, the carrier for a vehicle may be implemented in a manner desired by a user.

BRIEF DESCRIPTION OF THE DRAWINGS

FIG. 5 is a view illustrating a horizontal bar 80 in detail, in which FIG. 5A is an enlarged perspective view of the horizontal bar 80, FIG. 5B is a side view of a low-load supporting state, and FIG. 5C is a side view of middle-load/high-load supporting states.

FIG. 6 is a view illustrating another exemplary embodiment of the present invention, in which FIG. 6A is a perspective view illustrating an assembled state, FIG. 6B is an enlarged perspective view of the horizontal bar 80, and FIG. 6C is an enlarged perspective view illustrating a state in which a roof rail is detachably coupled.

DETAILED DESCRIPTION

Figure 1:
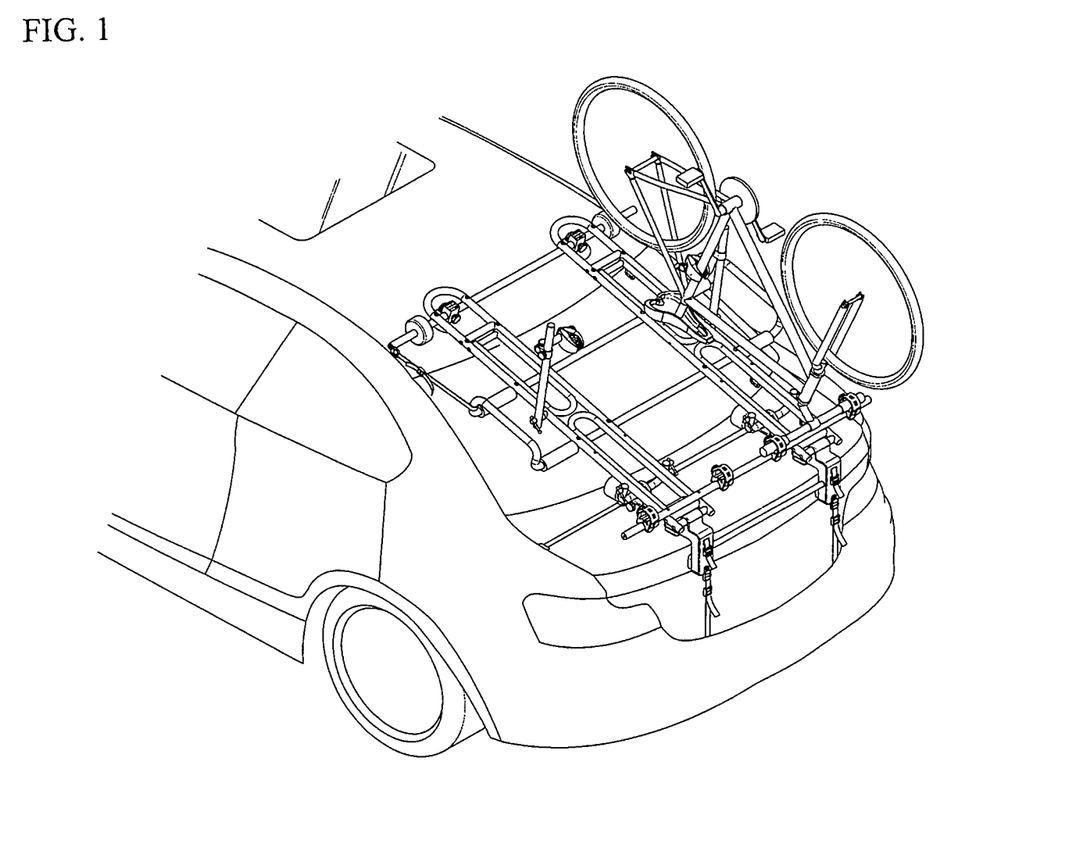
FIG. 1 is a rear perspective view illustrating a state in which an example of a carrier apparatus of the present invention is fixed to a trunk of a vehicle.

FIG. 1 is a rear perspective view illustrating a state in which an example of a carrier apparatus of the present invention is fixed to a trunk of a vehicle, and a bicycle is fixed upside down. As illustrated, the carrier apparatus is installed on the trunk, and the carrier apparatus is moved as the trunk is opened and closed, such that a sunroof of the vehicle is not covered, and an operation of the sunroof is not affected.

Figure 2:
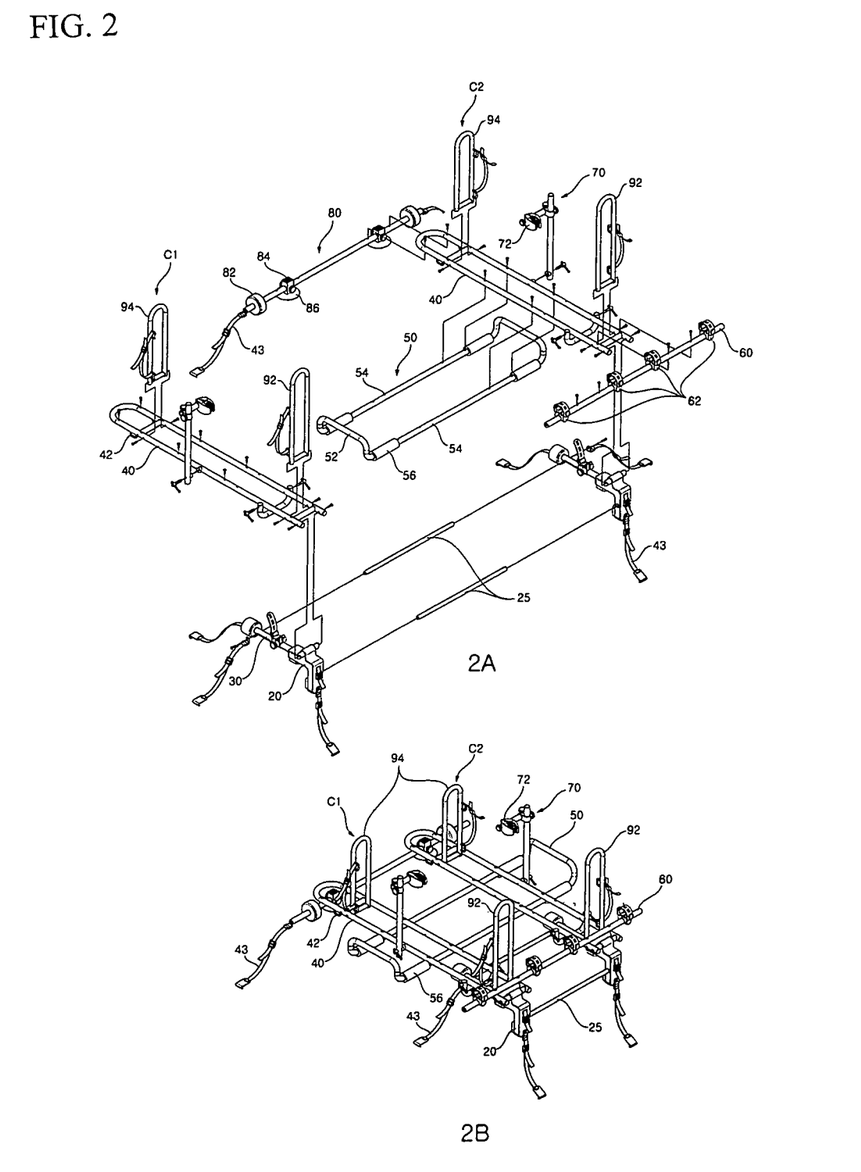
FIG. 2 is an exploded perspective view of a first exemplary embodiment of a carrier apparatus for a vehicle according to the present invention, and a perspective view illustrating a state in which the carrier apparatus is assembled.

FIG. 2 is an exploded perspective view of a first exemplary embodiment of the carrier apparatus for a vehicle according to the present invention, and a perspective view illustrating a state in which the carrier apparatus is assembled.

The carrier apparatus of the present exemplary embodiment has a structure in which two carriers C1 and C2 are disposed and coupled in parallel.

Each of the carriers C1 and C2 has a vertical support 20 which is supported on a rear surface of the trunk of the vehicle, a horizontal support 30 which is connected to the vertical support 20 at a fixed angle and supported on an upper surface of the trunk of the vehicle, an article mount 40 which is rotatably connected to the vertical support or the horizontal support, has a U shape entirely, and supports an article, and an article stand 92 which is rotatably connected to the vertical support or the horizontal support, is fixed at a right angle with respect to the article mount 40, and supports the article.

In the exemplary embodiment in FIG. 2, a horizontal supporting means 50 perpendicularly traverses the article mounts 40 of the two carriers C1 and C2 for a vehicle and is coupled to lower portions of the article mounts 40. The horizontal supporting means 50 is coupled by a fastener such as a bolt or a screw. The horizontal supporting means 50 has a quadrangular frame entirely having a rectangular shape, two lateral bars 52 of the quadrangular frame protrude upward from the article mounts 40, and shock absorbing members 56 are fitted with two horizontal bars 54 perpendicular to the lateral bars 52. The two lateral bars 52 protruding upward serve to support the article loaded onto the carrier apparatus so that the article is not moved laterally away from both sides of the carrier apparatus. In addition, the shock absorbing members 56 may be positioned at an edge of the horizontal bar 54, if possible. The shock absorbing member serves to prevent damage to the article loaded onto the carrier apparatus installed on the vehicle.

In addition, two reinforcing members 25 may horizontally connect the vertical supports 20 and the horizontal supports 30 of the two carriers C1 and C2 for a vehicle.

Figure 3:
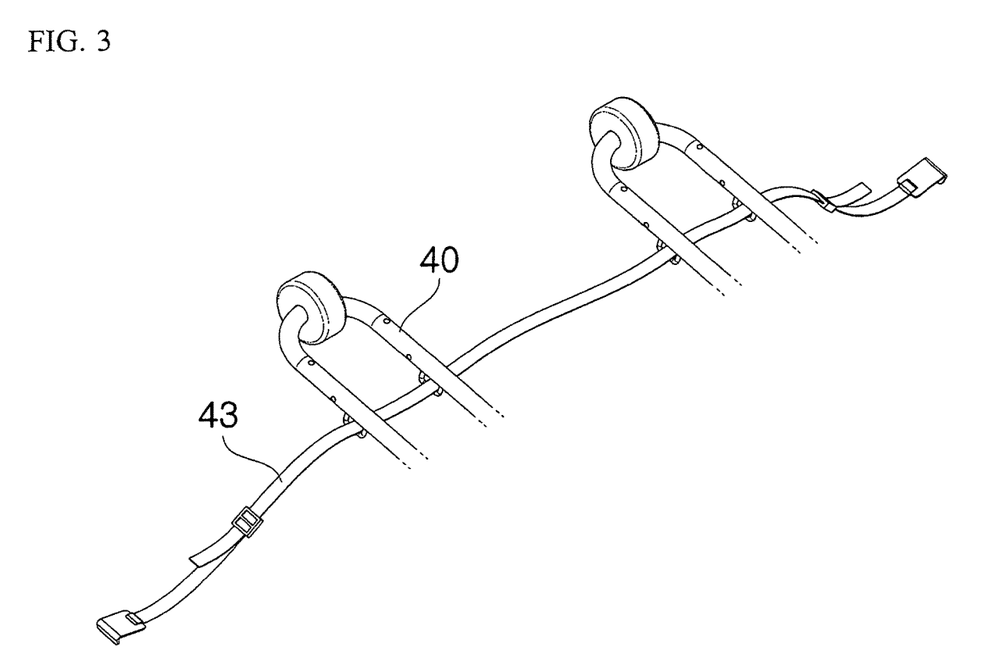
FIG. 3 is a partial enlarged perspective view illustrating a state in which a fixing strap is installed.

In addition, one or a plurality of loops 42 is formed on a bottom surface of the article mount 40 of each of the two carriers C1 and C2 for a vehicle, and a fixing strap 43 may be connected to or fitted into the loop. In this case, as illustrated in FIG. 3, the fixing strap 43, which is installed through the loop 42, may be fixedly tightened at an appropriate position of a vehicle body, for example, to a vehicle door frame, and as a result, it is possible to securely fix the carrier apparatus to the vehicle so that the carrier apparatus is not easily moved.

Of course, as illustrated in FIG. 2, as necessary, the fixing strap 43 may be connected to other portions of the carrier apparatus and fixed to the vehicle door frame or a gap of the trunk.

If necessary, a second article stand 94, which has the same structure as the article stand 92, may be rotatably installed on the article mount 40 of each of the two carriers C1 and C2 for a vehicle so as to be spaced apart from the article stand 92 at an interval.

Figure 4:
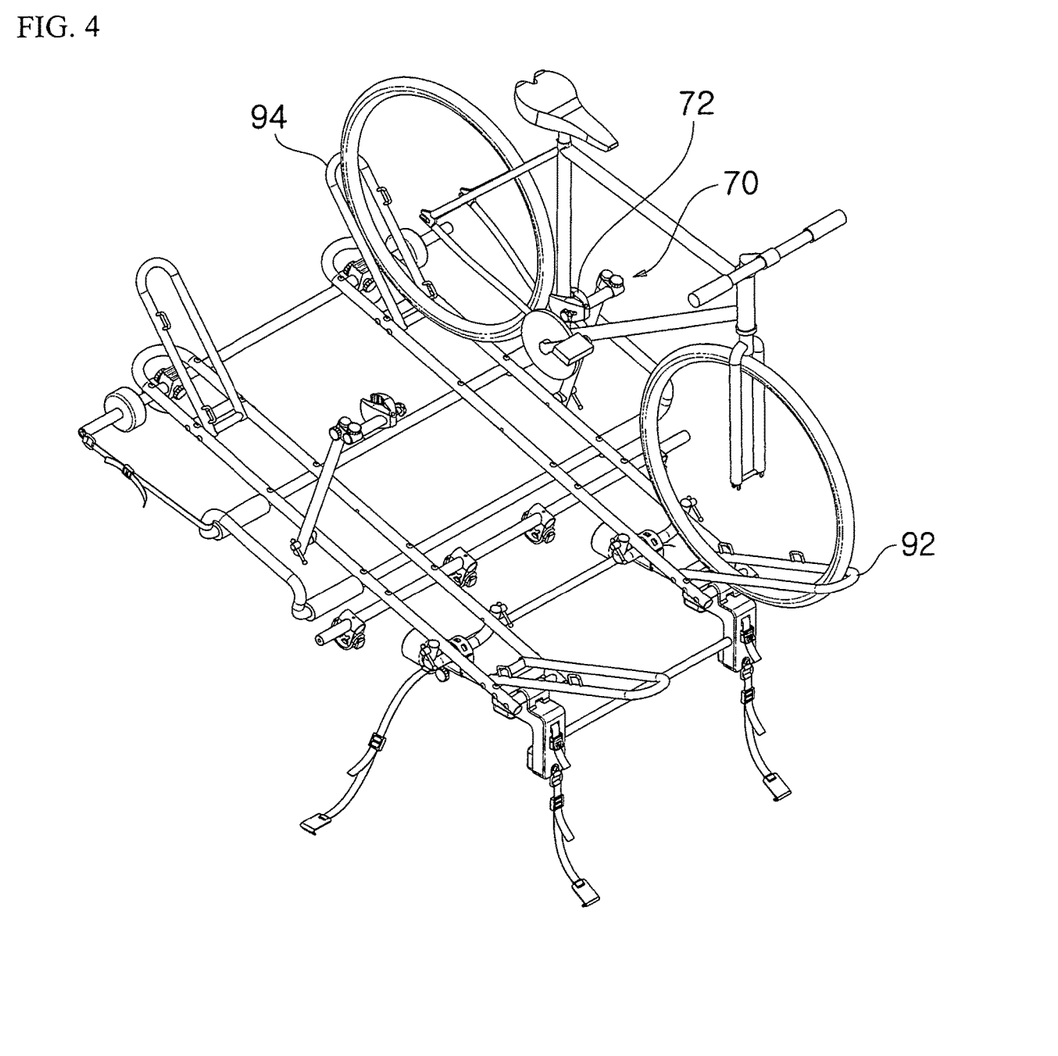
FIG. 4 is a perspective view illustrating an application example when a second article stand is added.

FIG. 4 is a perspective view illustrating an application example when the second article stand 94 is added. As illustrated, the article stand 92 and the second article stand 94 are spread, a front wheel and a rear wheel of a bicycle are fitted into the two article stands, and a frame of the bicycle is fixed by a clamp 72 of a fixing means 70 to be described below, such that the bicycle may be safely installed on the carrier apparatus.

In addition, the fixing means 70 having an inverted L shape is rotatably installed on each of the article mounts 40 at a position between the article stand 92 and the second article stand 94, and the clamp 72 is installed at an end portion of the fixing means 70. In this case, as illustrated in FIG. 4, the bicycle may be fixed by using the clamp 72, or a ski or board may be fixed by clamping one side of the ski or the board with the clamp 72 as described below, and as a result, thereby providing convenience. The fixing means 70 may be collapsed when no article is loaded (see FIG. 1).

As illustrated in FIG. 2, a straight handle horizontal bar 60 perpendicularly traverses the article mounts 40 at positions of rotatably connecting portions of the article stands 92 of the carriers C1 and C2, and the handle horizontal bar 60 may be coupled to the two article mounts 40. The handle horizontal bar 60 serves as a stopper that prevents the article stand 92 from being further rotated in a state in which the article stand 92 stands upright, and serves to support a handle of the bicycle when the bicycle is mounted upside down. In a case in which a plurality of handle fixing means 62 for coupling the handle of the bicycle to the handle horizontal bar 60 is installed, the handle of the bicycle may be securely tightened by the fixing means 62.

In addition, a straight horizontal bar 80 may be horizontally installed at a position of one end portion of the article mount 40 of each of the two carriers C1 and C2 for a vehicle.

Figure 5:
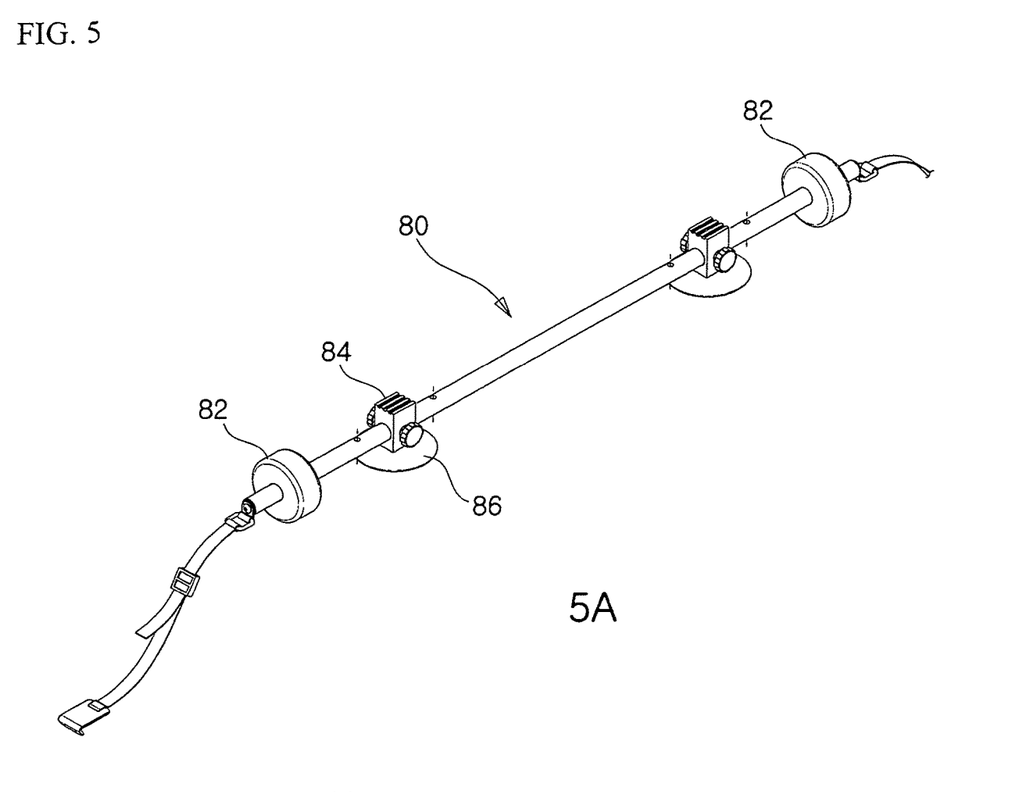

FIG. 5 is a view illustrating the horizontal bar 80 in detail, in which FIG. 5A is an enlarged perspective view of the horizontal bar 80, FIG. 5B is a side view of a low-load supporting state, and FIG. 5C is a side view of middle-load/high-load supporting states.

Circular wheels 82, which are made of a shock absorbing material, are rotatably installed at both sides of the horizontal bar 80, two shock absorbing members 84, which are made of a shock absorbing material, are rotatably installed on the horizontal bar 80 between the two wheels 82, one end portion of each of the shock absorbing members 84 has an uneven surface, and a sucker 86 is installed at a side opposite to the uneven surface. As illustrated in FIG. 5B, when a light article is loaded onto the carrier apparatus, the uneven surface of the shock absorbing member 84 is directed toward a vehicle roof. In this case, since the article is light in weight, all of the shock absorbing members 84 and the wheels 82 are separated from the vehicle roof. As illustrated in FIG. 5C, in a case in which a heavy article is loaded onto the carrier apparatus, when the shock absorbing member 84 is rotated by 180 degrees such that the sucker 86 is directed toward the vehicle roof, the sucker 84 is attached to the vehicle roof, and as a result, the article may be more stably supported without swaying.

Figure 6:
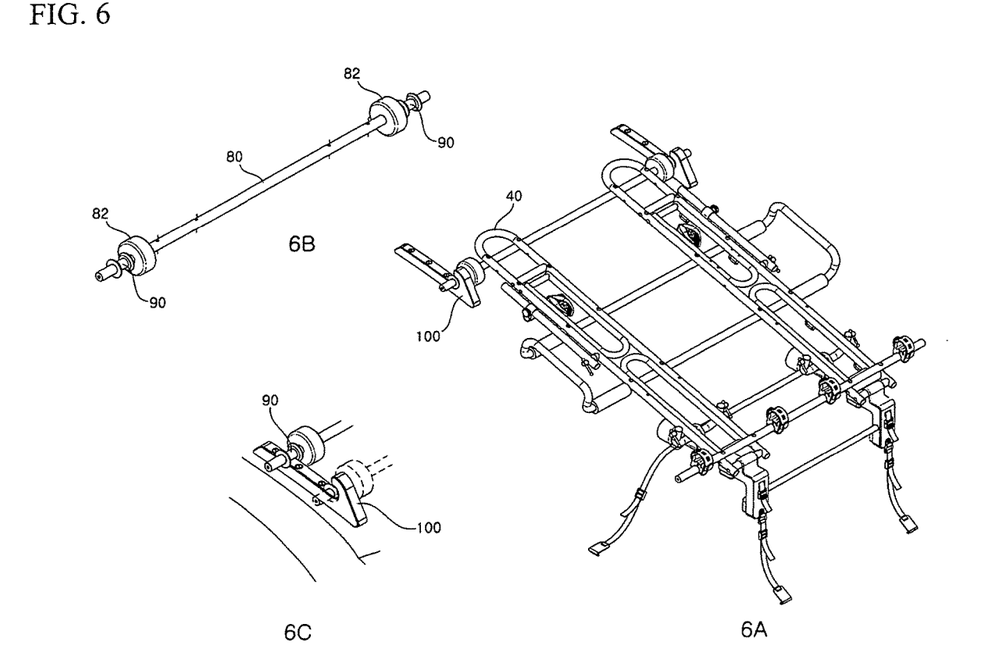

FIG. 6 is a view illustrating another exemplary embodiment of the present invention, in which FIG. 6A is a perspective view illustrating an assembled state, FIG. 6B is an enlarged perspective view of the horizontal bar 80, and FIG. 6C is an enlarged perspective view illustrating a state in which a roof rail is detachably coupled.

In the present exemplary embodiment, guide washers 90 having a spool shape are installed at both end portions of the horizontal bar outside the two wheels 82, and loop-shaped roof rails 100, which are fixed to the vehicle roof at positions corresponding to the guide washers 90 and detachably coupled to the guide washers 90, are installed at both sides of the vehicle roof. In this case, when the vehicle trunk is opened in the state in which the carrier apparatus is installed as illustrated in FIG. 1, the guide washer 90 is separated from the roof rail 100 as the article mount 40 moves forward toward a front side of the vehicle, and the wheel 82 rolls along the vehicle roof, as indicated by a solid line in FIG. 6C. When the trunk is closed, the guide washer 90 is engaged with a loop portion of the roof rail 100 as the article mount 40 moves rearward as indicated by a break line in FIG. 6C, such that the carrier apparatus is securely fixed to the vehicle.

Figure 7:
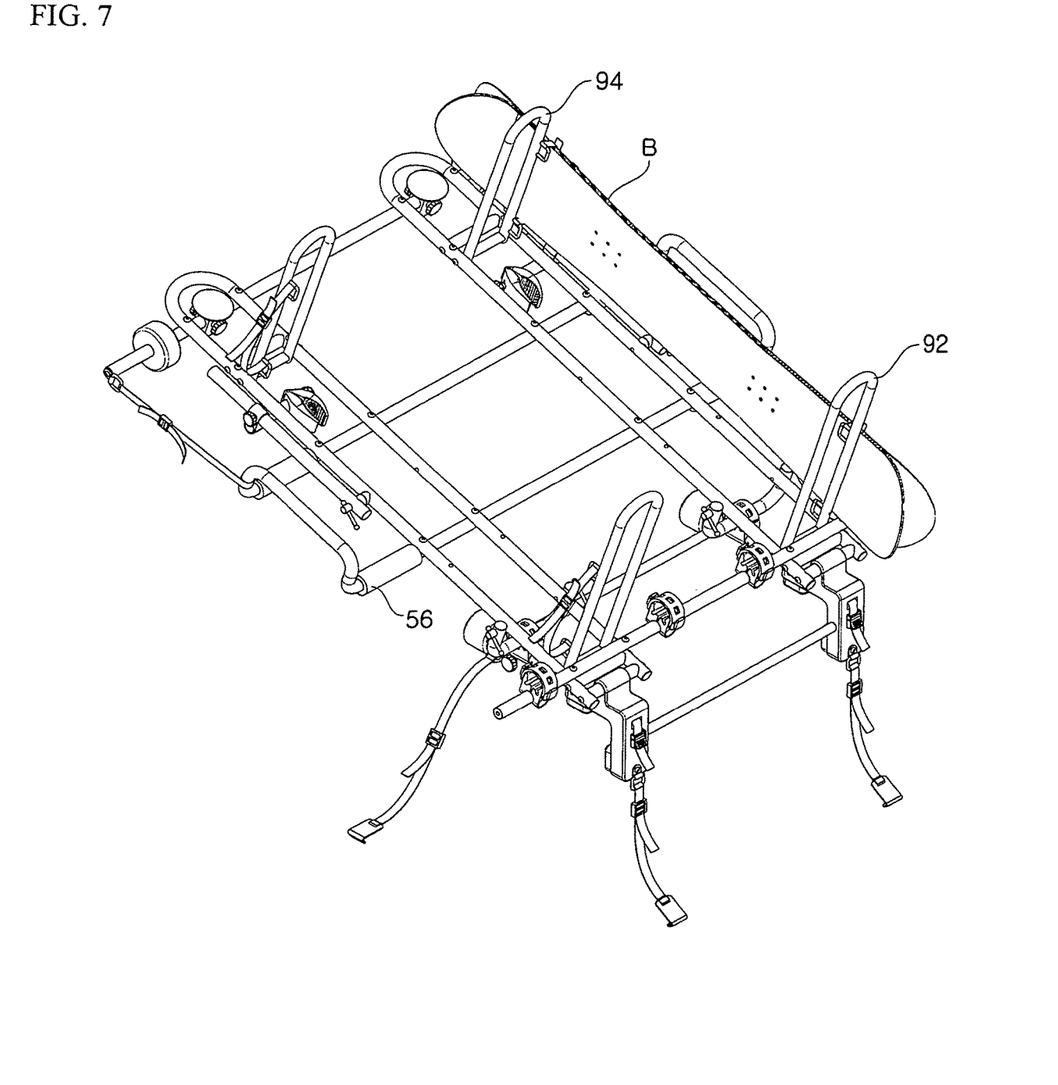
FIG. 7 is a perspective view illustrating a state in which skis or a board are installed on the carrier apparatus of the present invention.

FIG. 7 is a perspective view illustrating a state in which skis or a board are installed on the carrier apparatus of the present invention. A board B may be simply installed by allowing the board B to stand on its side outside the front and rear article stands 92 and 94, supporting the board B on the shock absorbing member 56, and fixing the board B on the article stands 92 and 94 with the strap.

Figure 8:
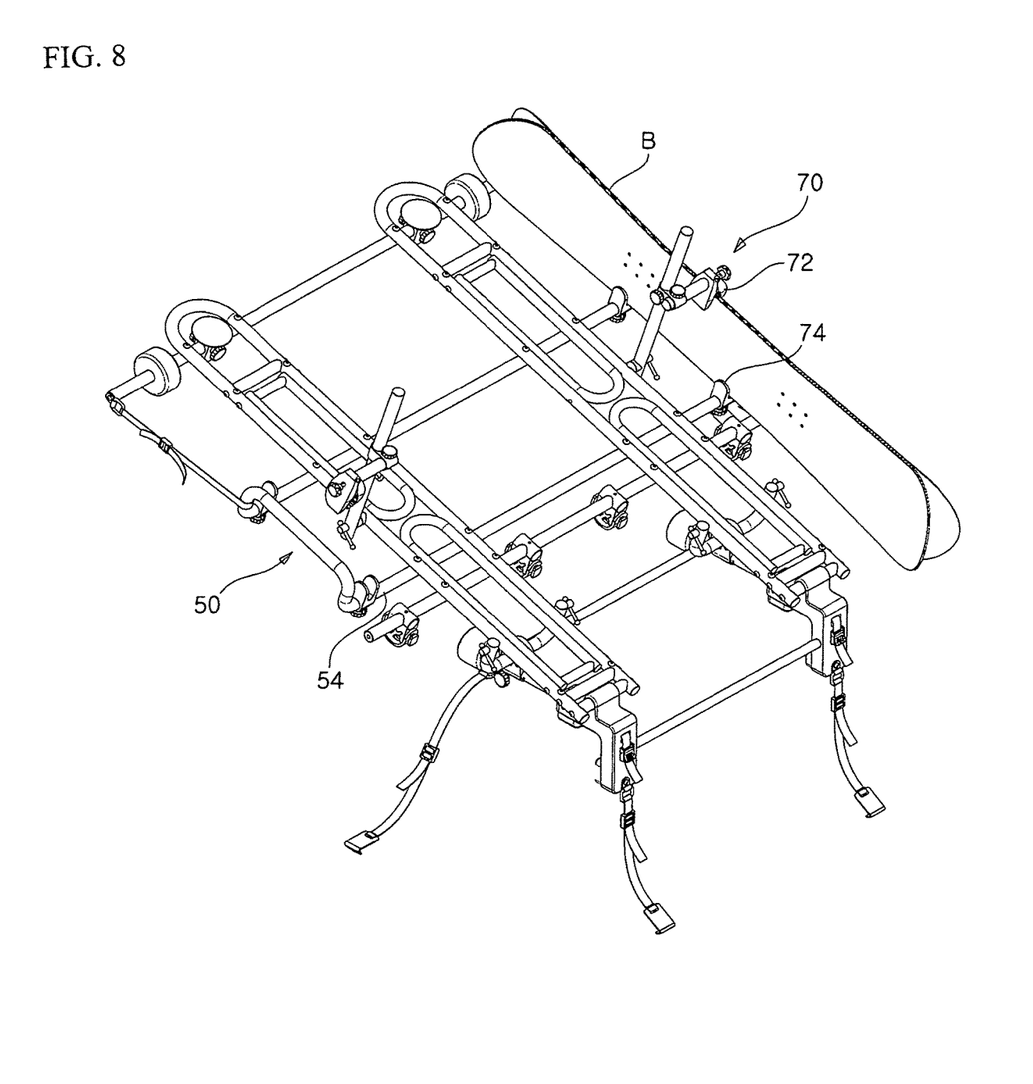
FIG. 8 is a perspective view illustrating another example in which a board B is fixed.

FIG. 8 is a perspective view illustrating another example in which the board B is fixed. A U-shaped ski/board mount 74 may be installed at one end portion or both end portions of the horizontal bar 54 of the horizontal supporting means 50. In this case, a lower edge portion of the ski or board B is inserted into a groove of the ski/board mount 74, and an upper edge portion of the ski or board is fixed by the clamp 72 of the supporting means 70, and as a result, the ski or board may be more simply fixed.

Figure 9:
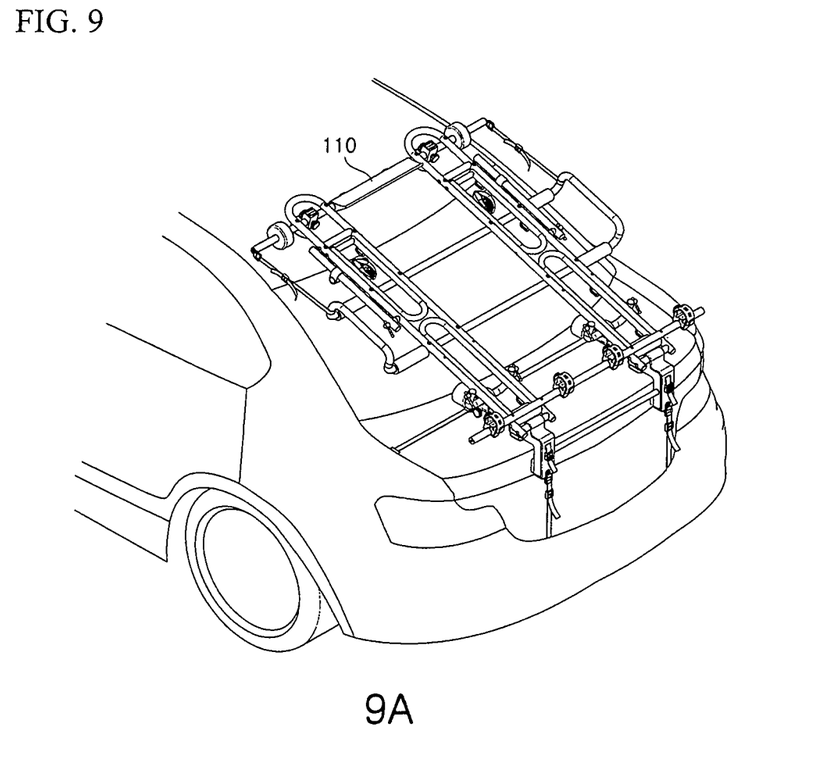
FIG. 9A is a perspective view illustrating a state in which a streamlined flap is installed.
FIG. 9B is a side view illustrating a principle that lift force is generated in a gravitational direction.

When the vehicle travels at a high speed, the carrier apparatus of the present invention may cause high air resistance, and in this case, vibration and noise may occur. To prevent vibration and noise, the present invention uses an aerodynamic streamlined resistance reducing means. FIG. 9 is a view illustrating this exemplary embodiment, in which FIG. 9A is a perspective view illustrating a state in which the streamlined resistance reducing means is installed, and FIG. 9B is a side view illustrating only the resistance reducing means.

As illustrated in FIG. 9, a flap 110 having a streamlined blade shape is installed as the air resistance reducing means on the horizontal bar 80. That is, when the vehicle travels in the state in which the sucker 86 is attached to the vehicle roof, downward pressure is applied in a direction of an arrow P as air flows in a direction of an arrow D along a streamlined surface of the flap 110, such that air resistance acting on the carrier apparatus of the present invention may be reduced, and as a result, it is possible to more safely carry the article.

What is claimed is:

1. A carrier apparatus for a vehicle, in which two carriers C1 and C2 for a vehicle are disposed and coupled in parallel and each of the carriers C1 and C2 has a vertical support 20 which is supported on a rear surface of a trunk of the vehicle, a horizontal support 30 which is connected to the vertical support 20 at a fixed angle and supported on an upper surface of the trunk of the vehicle, an article mount 40 which is rotatably connected to the vertical support or the horizontal support, has a U shape entirely, and supports an article, and an article stand 92 which is rotatably connected to the vertical support or the horizontal support, is fixed at a right angle with respect to the article mount 40, and supports the article, the carrier apparatus comprising:

a horizontal supporting means 50 which perpendicularly traverses the article mounts 40 of the two carriers C1 and C2 for a vehicle, is coupled to lower portions of the article mounts 40, has two lateral bars 52 protruding upward from the article mounts 40, has shock absorbing members 56 fitted with two horizontal bars 54 perpendicular to the lateral bars 52, and has a quadrangular frame shape;

two reinforcing members 25 which horizontally connect the vertical supports 20 and the horizontal supports 30 of the two carriers C1 and C2 for a vehicle; and loops 42 which are installed on bottom surfaces of the article mounts 40 of the two carriers C1 and C2 for a vehicle such that a fixing strap 43 is fitted with the loop 42, wherein a second article stand 94, which has the same structure as the article stand 92, is rotatably installed on the article mount 40 of each of the two carriers C1 and C2 for a vehicle so as to be spaced apart from the article stand 92 at an interval, and the fixing strap 43, which is installed through the loops 42, is fixedly tightened to a vehicle body including a vehicle door frame.

2. The carrier apparatus of claim 1, wherein a fixing means 70 having an inverted L shape is rotatably installed on each of the article mounts 40 at a position between the article stand 92 and the second article stand 94, and a clamp 72 is installed at an end portion of the fixing means 70, such that a bicycle is fixed by clamping a frame of the bicycle with the clamp, or a ski or board is fixed by clamping one side of the ski or board with the clamp.

3. The carrier apparatus of claim 1, further comprising:
a straight handle horizontal bar 60 which perpendicularly traverses the article mounts 40 at positions of rotatably connecting portions of the article stands 92 of the carriers C1 and C2, is coupled to the two article mounts 40, serves as a stopper for preventing the article stand 92 from being further rotated in a state in which the article stand 92 stands upright, and supports a handle of a bicycle when the bicycle is mounted,
wherein a plurality of handle fixing means 62 for coupling the handle of the bicycle to the handle horizontal bar 60 is installed.

4. The carrier apparatus of claim 1, further comprising:
a straight horizontal bar 80 which is horizontally installed at a position of one end portion of the article mount 40 of each of the two carriers C1 and C2 for a vehicle,
wherein circular wheels 82, which are made of a shock absorbing material, are rotatably installed at both sides of the horizontal bar 80, two shock absorbing members 84, which are made of a shock absorbing material, are rotatably installed on the horizontal bar 80 between the two wheels 82, one end portion of each of the shock absorbing members 84 has an uneven surface, and a sucker 86 is installed at a side opposite to the uneven surface, such that the uneven surface of the shock absorbing member 84 is directed toward a vehicle roof when supporting a small load, and the sucker 86 is directed toward the vehicle roof and attached to the vehicle roof when supporting a heavy load.

5. The carrier apparatus of claim 4, wherein guide washers 90 having a spool shape are installed at both end portions of the horizontal bar outside the two wheels 82, and loop-shaped roof rails 100, which are fixed to the vehicle roof at positions corresponding to the guide washers 90 and detachably coupled to the guide washers 90, are installed at both sides of the vehicle roof, such that when the vehicle trunk is opened in the state in which the carrier apparatus is installed, the guide washer 90 is separated from the roof rail 100 as the article mount 40 moves forward toward a front side of the vehicle and the wheel 82 rolls along the vehicle roof, and when the trunk is closed, the guide washer 90 is engaged with a loop portion of the roof rail 100 as the article mount 40 moves rearward, such that the carrier apparatus is fixed to the vehicle.

6. The carrier apparatus of claim 2, wherein a U-shaped ski/board mount 74 is installed at one end portion or both end portions of the horizontal bar 54 of the horizontal supporting means 50, a lower edge portion of the ski or board is inserted into a groove of the ski/board mount 74, and an upper edge portion of the ski or board is fixed by the clamp 72 of the supporting means 70.

7. The carrier apparatus of claim 4, wherein a flap 110 having a streamlined blade shape is installed on the horizontal bar 80 to reduce air resistance when the vehicle travels.

8. The carrier apparatus of claim 2, further comprising:
a straight horizontal bar 80 which is horizontally installed at a position of one end portion of the article mount 40 of each of the two carriers C1 and C2 for a vehicle,
wherein circular wheels 82, which are made of a shock absorbing material, are rotatably installed at both sides of the horizontal bar 80, two shock absorbing members 84, which are made of a shock absorbing material, are rotatably installed on the horizontal bar 80 between the two wheels 82, one end portion of each of the shock absorbing members 84 has an uneven surface, and a sucker 86 is installed at a side opposite to the uneven surface, such that the uneven surface of the shock absorbing member 84 is directed toward a vehicle roof when supporting a small load, and the sucker 86 is directed toward the vehicle roof and attached to the vehicle roof when supporting a heavy load.

9. The carrier apparatus of claim 8, wherein guide washers 90 having a spool shape are installed at both end portions of the horizontal bar outside the two wheels 82, and loop-shaped roof rails 100, which are fixed to the vehicle roof at positions corresponding to the guide washers 90 and detachably coupled to the guide washers 90, are installed at both sides of the vehicle roof, such that when the vehicle trunk is opened in the state in which the carrier apparatus is installed, the guide washer 90 is separated from the roof rail 100 as the article mount 40 moves forward toward a front side of the vehicle and the wheel 82 rolls along the vehicle roof, and when the trunk is closed, the guide washer 90 is engaged with a loop portion of the roof rail 100 as the article mount 40 moves rearward, such that the carrier apparatus is fixed to the vehicle.

10. The carrier apparatus of claim 8, wherein a flap 110 having a streamlined blade shape is installed on the horizontal bar 80 to reduce air resistance when the vehicle travels.

11. The carrier apparatus of claim 3, further comprising:
a straight horizontal bar 80 which is horizontally installed at a position of one end portion of the article mount 40 of each of the two carriers C1 and C2 for a vehicle,
wherein circular wheels 82, which are made of a shock absorbing material, are rotatably installed at both sides of the horizontal bar 80, two shock absorbing members 84, which are made of a shock absorbing material, are rotatably installed on the horizontal bar 80 between the two wheels 82, one end portion of each of the shock absorbing members 84 has an uneven surface, and a sucker 86 is installed at a side opposite to the uneven surface, such that the uneven surface of the shock absorbing member 84 is directed toward a vehicle roof when supporting a small load, and the sucker 86 is directed toward the vehicle roof and attached to the vehicle roof when supporting a heavy load.

12. The carrier apparatus of claim 11, wherein guide washers 90 having a spool shape are installed at both end portions of the horizontal bar outside the two wheels 82, and loop-shaped roof rails 100, which are fixed to the vehicle roof at positions corresponding to the guide washers 90 and detachably coupled to the guide washers 90, are installed at both sides of the vehicle roof, such that when the vehicle trunk is opened in the state in which the carrier apparatus is installed, the guide washer 90 is separated from the roof rail 100 as the article mount 40 moves forward toward a front side of the vehicle and the wheel 82 rolls along the vehicle roof, and when the trunk is closed, the guide washer 90 is engaged with a loop portion of the roof rail 100 as the article mount 40 moves rearward, such that the carrier apparatus is fixed to the vehicle.

13. The carrier apparatus of claim 11, wherein a flap 110 having a streamlined blade shape is installed on the horizontal bar 80 to reduce air resistance when the vehicle travels.

* * * * *